United States Patent [19]
Chiou et al.

[11] Patent Number: 5,463,790
[45] Date of Patent: Nov. 7, 1995

[54] WINDSHIELD WIPER WITH AN AUTOMATIC PRESSURE MEANS

[76] Inventors: Xian-Shun Chiou, 19 Ping-Yang Street; Chih-Hsien Wong, 2F., 38, Lane 92 Hua-Ling Street, both of Taipei, Taiwan

[21] Appl. No.: 251,194

[22] Filed: May 31, 1994

[51] Int. Cl.⁶ .................................. B60S 1/38; B60S 1/28
[52] U.S. Cl. .................................. 15/250.29; 15/250.41; 15/250.44
[58] Field of Search ........................... 15/250.41, 250.42, 15/250.20, 250.33, 250.36, 250.40

[56] References Cited

U.S. PATENT DOCUMENTS

| | | | |
|---|---|---|---|
| 449,635 | 3/1891 | Pinfold | 84/484 |
| 725,492 | 4/1903 | Seifried | 400/698 |
| 2,025,888 | 12/1935 | Olivero | 15/250.33 |
| 2,794,203 | 6/1957 | Oishei | 15/250.2 |
| 3,009,185 | 11/1961 | Adams | 15/250.41 |
| 3,631,561 | 1/1972 | Aszkenas | 15/250.41 |
| 3,747,152 | 7/1973 | Tsuruzawa | 15/160 |
| 4,590,638 | 5/1986 | Beneteau | 15/250.2 |
| 5,150,498 | 9/1992 | Charng | 15/250.41 |
| 5,243,731 | 9/1993 | Yang | 15/250.41 |
| 5,257,436 | 11/1993 | Yang | 15/250.41 |
| 5,311,636 | 5/1994 | Lee | 15/250.42 |

FOREIGN PATENT DOCUMENTS

| | | | |
|---|---|---|---|
| 2594083 | 8/1987 | France | 15/250.42 |
| 3142326 | 5/1983 | Germany | 15/250.33 |
| 0138048 | 10/1981 | Japan | 15/250.36 |

*Primary Examiner*—Gary K. Graham
*Attorney, Agent, or Firm*—Beveridge, DeGrandi, Weilacher & Young

[57] ABSTRACT

A windshield wiper includes a master wiper arm, a rubber blade operatively connected to the master wiper arm and a pressure mechanism mounted at a top portion of the master wiper arm for pressing the rubber blade against a windshield. The pressure mechanism includes a wing, a pivot fastened to one side of the wing, and a gear fastened to the pivot. A prestressing mechanism is mounted on the master wiper arm and engaged with the pressure mechanism. This prestressing mechanism includes a gear meshed with the gear of the pressure mechanism, a threaded member fixed to said gear of the prestressing mechanism, an adjusting screw and an elastic element between the threaded member and the adjusting screw. The screw encloses the prestressing mechanism and exerts prestress force to the elastic element, such that the force is transmitted to the gear of the prestressing mechanism via the threaded member. The rubber blade is connected to the master wiper arm by two assemblies, wherein each assembly includes an auxiliary wiper arm which provides three end portions at which the rubber blade is connected to the assembly. Clamps are provided at the ends of the auxiliary wiper arms. These clamps clamp onto a blade holder of the rubber blade. Each clamp includes a clamping body for clamping onto the blade holder, and a cylindrical rib is raised from a top of the clamping body.

16 Claims, 2 Drawing Sheets

WINDSHIELD WIPER WITH AN AUTOMATIC PRESSURE MEANS

TECHNICAL FIELD

The present invention relates to a windshield wiper with an automatic pressure means which automatically adjusts the pressure to the squeegee according to the speed of the car or the strength of the wind force, so as to automatically change the acting surface of the rubber blade causing the rubber blade to closely contact the windshield.

BACKGROUND OF THE INVENTION

A variety of windshield wipers have been disclosed and intensively used. These windshield wipers may have a pressure mechanism integrally constructed with the frame assembly or externally provided thereto. However, the installation of such a pressure mechanism may destroy the sense of beauty of the windshield wiper, because of its fixed installed location.

Furthermore, the windshield wipers which are disclosed in U.S. Pat. Nos. 449,635; 725,492; 2,025,888; 3,631,561; 3,747,.152; 5,243,731 commonly use a double-strip rubber blade contacting a windshield and reciprocated to wipe off rain, snow, etc., from the windshield. These windshield wipers are commonly complicated in structure. Because the double-strip rubber blade or cleaning brush is fastened to an elongated, integral holder frame, the whole assembly is less flexible. If the holder frame is molded from plastics, it will age and deform quickly under the radiation of sunlight. If the holder frame is deformed or becomes stiff after long uses, the holder frame becomes unable to maintain the rubber blade or cleaning brush in close contact with the windshield, and therefore the windshield wiper becomes unable to effectively wipe off rain, snow, etc., from the windshield. Because the windshields of regular motor vehicles commonly have a curved surface, a small deformation of the holder frame causes the holder frame to be unable to keep the rubber blade or cleaning brush in close contact with the windshield.

SUMMARY OF THE INVENTION

The present invention has been accomplished under the aforesaid circumstances. It is one object of the present invention to provide a windshield wiper which has pressure mechanisms equipped with wings that automatically open and increase the pressure to the rubber blade when the strength of wind force surpasses a predetermined level and also automatically close again when the wind force becomes weak, so as to maintain a good looking and integral appearance of the windshield wiper. It is another object of the present invention to provide a windshield wiper which has a double-strip rubber blade that will automatically change its acting surface against the windshield when its moving direction is changed, so that it is constantly maintained in close contact to the surface of the windshield.

According to the present invention, the windshield wiper is comprised of a master wiper arm, two auxiliary wiper arms pivotally connected to the master wiper arm at either end, a blade holder fastened to the auxiliary wiper arms, and a double-strip rubber blade fixed to the blade holder. The master wiper arm comprises two pressure mechanisms and two prestressing mechanisms respectively coupled to the pressure mechanisms. Each pressure mechanism comprises a wing (which may be made as a single piece or formed of a plurality of foils linked together), a pivot longitudinally fastened to the wing at one side to hold the wing to the master wiper arm, and a gear fixed to the pivot at one end. Each prestressing mechanism comprises a gear meshed with the gear on either pressure mechanism, an elastic element, and an adjusting screw. By turning the adjusting screw in either direction, the prestress given by the elastic element to the respective pressure mechanism is adjusted. Furthermore, each auxiliary wiper arm has a plurality of presser ends attached with a respective clamp to hold the blade holder. The clamp comprises a clamping body clamped on the blade holder, and a cylindrical rib transversely raised from the clamping body at the top and fitted into an arched retainer portion on either presser end of either auxiliary wiper arm. Therefore, the clamp can be turned back and forth in the radial direction. When the pressure of wind force surpasses the pressure given by the prestressing mechanisms to the pressure mechanisms, the wings of the pressure mechanisms will be automatically lifted to increase the pressure of the rubber blade against the windshield. Because the double-strip rubber blade is fixed to the blade holder and the blade holder is connected to the auxiliary wiper arms by point contact, the blade holder does not deform and is maintained resilient to keep the double-strip rubber blade in close contact with the windshield. Furthermore, because the clamp is pivotably connected to either presser end of either auxiliary wiper arm, the double-strip rubber blade will automatically change its acting surface when its moving direction is changed.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
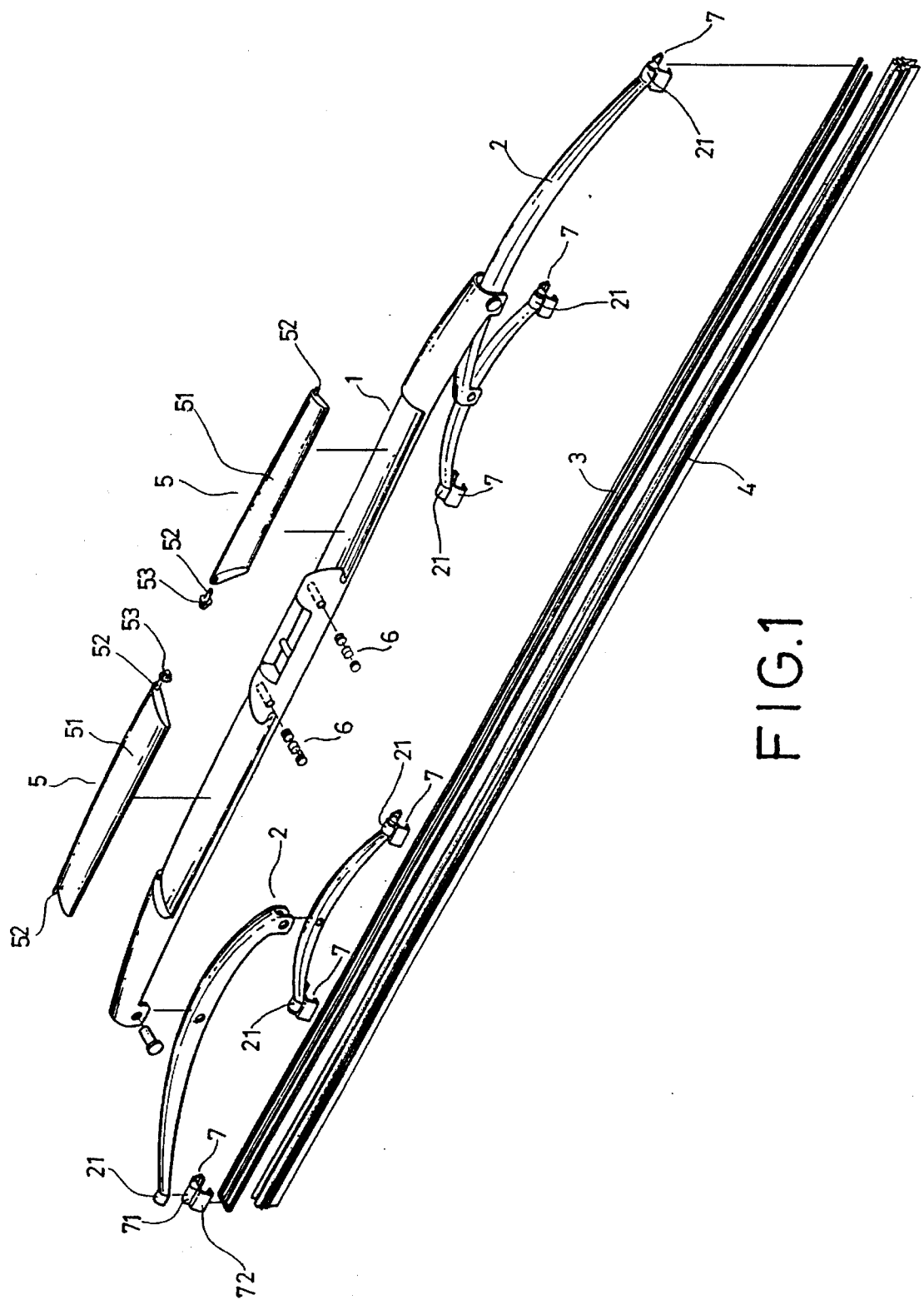
FIG. 1 is an exploded view of a windshield wiper according to the present invention.
Figure 2:
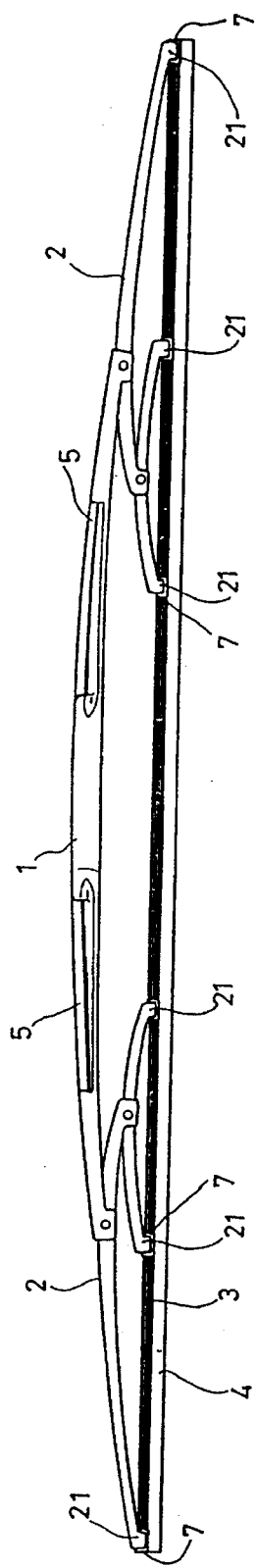
FIG. 2 is an assembly view of the windshield wiper shown in FIG. 1.
Figure 3:
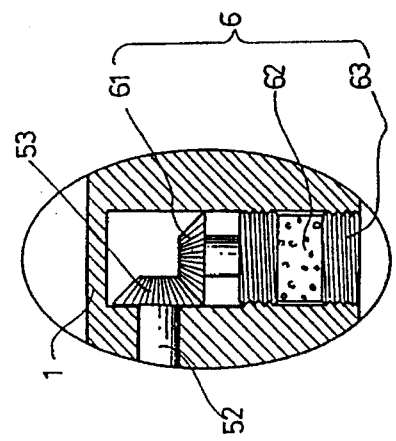
FIG. 3 is a sectional view showing the arrangement of the prestressing mechanism for the windshield wiper shown in FIG. 1.

Referring to FIGS. 1 and 2, a windshield wiper in accordance with the present invention is generally comprised of a master wiper arm 1, two auxiliary wiper arms 2, a blade holder 3, and a double-strip rubber blade 4. The auxiliary wiper arms 2 are fastened to the two opposite ends of the wiper arm 1, having each a plurality of presser ends 21 connected to the blade holder 3, which is made of metal and holds down the double-strip rubber blade 4. Two pressure mechanisms 5 are symmetrically mounted on the master wiper arm 1 at the top, each including a wing 51, a pivot 52 longitudinally fastened to the wing 51 at one side to hold the wing 51 to the master wiper arm 1, and a pivot gear 53 fastened to the pivot 52 at an inner end (close to the mid point of the master wiper arm 1). Two prestressing mechanisms 6 are symmetrically mounted on the master wiper arm 1 and respectively engaged with the pressure mechanisms 5. Each prestressing mechanism 6 includes a prestress gear 61 meshed with the gear 53 on either pressure mechanism 5, a threaded member 64 fixed with said gear 61 and rotatably engaged with threads in said master wiper arm 1 to rotatably support the gear 61, an adjusting screw 63 rotatably engaging threads in said master wiper arm 1, threaded member 64, and an elastic element 62 stopped between the gear 61 and the adjusting screw 63 (see FIG. 3). By means of turning the adjusting screw 63 in either direction, the prestress given by the elastic element 62 to the gear 61 is adjusted.

Figure 4:
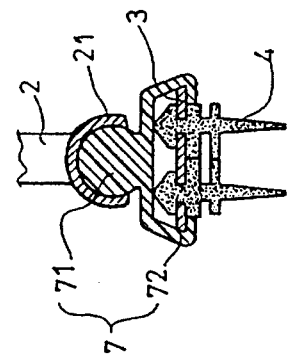
FIG. 4 is a sectional view showing the connection of the presser end with the clamp according to the present invention.

Referring to FIG. 4, each presser end 21 of either auxiliary wiper arm 2 is respectively fastened with a clamp 7 to hold the blade holder 3. The clamp 7 comprises a clamping body 72 clamped on the blade holder 3, and a cylindrical rib 71 transversely raised from the clamping body 72 at the top and fitted into the arched retainer portion of either presser end 21 of either auxiliary wiper arm 2. When assembled, the cylindrical rib 71 of the clamp 7 can be turned within the arched portion in the radial direction within a fixed angle.

When the wind force acting on the wings 51 of the pressure mechanisms 5 surpasses the pressure given by the prestressing mechanism 6 to the pressure mechanism 5, the wings are lifted (because the wings 51 are pivotably fastened to the master wiper arm 1 by the pivots 52) to increase the pressure being given to the double-strip rubber blade 4 against the windshield. Because the double-strip rubber blade 4 is fixed to the metal blade holder 3 and the blade holder 3 is connected to the auxiliary wiper arms 2 by point contact, the blade holder 3 does not deform and is maintained resilient to keep the double-strip rubber blade 4 in close contact with the windshield. Furthermore, because the clamp 7 is pivotally connected to either presser end 21 of either auxiliary wiper arm 2, the double-strip rubber blade 4 will automatically change its acting surface when its moving direction is changed.

What is claimed is:

1. A windshield wiper for wiping a windshield, said wiper comprising:

an elongated master wiper arm;

two auxiliary wiper arms fastened to opposite ends of said master wiper arm, such that each auxiliary wiper arm includes a first presser end, a second presser end and a third presser end;

a clamp provided at and coupled to each presser end of each auxiliary wiper arm;

a double-strip rubber blade connected to the clamp at each presser end; and two pressure mechanisms mounted at a top portion of said master wiper arm to press the rubber blade against the windshield, wherein each of said pressure mechanisms includes a wing having spaced lateral edges, a pivot pivotally connecting said wing along one edge to said master wiper arm, and a pivot gear fastened to said pivot proximate a mid point of said master wiper arm, wherein each of said pressure mechanisms further includes a prestressing mechanism mounted on said master wiper arm and respectively engaged with said pressure mechanisms to rotatably bias a respective wing about said pivot; each of said prestressing mechanisms including a prestress gear meshed with the pivot gear of an associated pressure mechanism, a threaded member fixed to said prestress gear and threadingly engaged with said master wiper arm, an adjusting screw threadingly engaged with said master wiper arm and an elastic element stopped between said threaded member and the adjusting screw; said adjusting screw being adjustable for exerting prestress force to the elastic element, such that the force is transmitted to said prestress gear of said prestressing mechanism via said threaded member.

2. A windshield wiper according to claim 1, wherein each of said clamps at said presser ends includes a clamping body for clamping on a blade holder of the rubber blade, and a cylindrical rib transversely raised from a top of the clamping body.

3. A windshield wiper according to claim 2, wherein each of said presser ends of said auxiliary wiper arm includes an arched retainer portion fitted with said cylindrical rib of said clamp, such that said clamp is rotatable within said arched retainer portion of said presser end on said cylindrical rib, and the clamp can be turned within the arched retainer portion about a limited angle.

4. A windshield wiper for wiping a windshield, said wiper comprising:

an elongated master wiper arm;

two auxiliary wiper arms fastened to opposite ends of said master wiper arm, wherein each auxiliary wiper arm provides three end portions, wherein each end portion defines a presser end;

a rubber blade connected to the presser ends;

a pressure mechanism mounted at a top portion of said master wiper arm to press the rubber blade against the windshield, wherein said pressure mechanism includes a wing having spaced lateral edges, a pivot pivotally connecting said wing along one edge to said master wiper arm, and a pivot gear fastened to said pivot, wherein said pressure mechanism further includes a prestressing mechanism mounted on said master wiper arm and engaged with said pressure mechanism to rotatably bias the wing about the pivot; said prestressing mechanism including a prestress gear meshed with the pivot gear of said pressure mechanism, a threaded member fixed to said prestress gear and threadingly engaged with the master wiper arm, an adjusting screw threadingly engaged with the master wiper arm and an elastic element disposed between the threaded member and the adjusting screw; said adjusting screw being adjustable for exerting prestress force to the elastic element, such that the force is transmitted to said prestress gear of said prestressing mechanism via said threaded member.

5. A windshield wiper according to claim 4, wherein each of said presser ends includes a clamp attached thereto.

6. A windshield wiper according to claim 5, wherein each said clamp includes a clamping body for clamping on a blade holder of the rubber blade, and a cylindrical rib transversely raised from a top of the clamping body.

7. A windshield wiper according to claim 6, wherein each of said presser ends includes an arched retainer portion fitted with said cylindrical rib of said clamp such that the cylindrical rib of the clamp is rotatable within the arched retainer portion about a fixed angle.

8. A windshield wiper for wiping a windshield, said wiper comprising:

a master wiper arm;

a rubber blade operatively connected to the master wiper arm;

a pressure mechanism mounted at a top portion of said master wiper arm to press the rubber blade against the windshield, wherein said pressure mechanism includes a wing, a pivot pivotally connecting said wing to said master wiper arm, and a pivot gear connected to said pivot; and a prestressing mechanism mounted on said master wiper arm and engaged with said pressure mechanism to rotatably bias said wing about said pivot; said prestressing mechanism including a prestress gear meshed with the pivot gear of said pressure mechanism, a threaded member fixed to said prestress gear and threadingly engaged with the master wiper arm, an adjusting screw threadingly engaged with the master wiper arm and an elastic element disposed between said threaded member and the adjusting screw; said adjusting screw exerting prestress force to the elastic element, such that the force is transmitted to said prestress gear of said prestressing mechanism via said threaded member.

9. A windshield wiper according to claim 8, wherein said rubber blade is connected to said master wiper arm by at least one assembly including an auxiliary wiper arm.

10. A windshield wiper according to claim 9, wherein said auxiliary wiper arm includes three end portions, wherein a clamp is provided at each end portion for clamping onto said rubber blade.

11. A windshield wiper according to claim 10, wherein each of said clamps includes a clamping body for clamping on a blade holder of the rubber blade, and said clamps further including a cylindrical rib raised from a top of the clamping body.

12. A windshield wiper according to claim 11, wherein each of said end portions includes an arched retainer portion fitted with said cylindrical rib of said clamp, such that said cylindrical rib of the clamp rotates within the arched retainer portion about a limited angle.

13. A windshield wiper according to claim 8, wherein said rubber blade is connected to said master wiper arm by two said assemblies, wherein each assembly includes an auxiliary wiper arm.

14. A windshield wiper according to claim 13, wherein each auxiliary wiper arm includes three end portions, wherein a clamp for clamping onto said rubber blade is provided at each end portion.

15. A windshield wiper according to claim 14, wherein each of said clamps includes a clamping body for clamping on a blade holder of the rubber blade, and said clamps further including a cylindrical rib raised from a top of the clamping body.

16. A windshield wiper according to claim 15, wherein each of said end portions includes an arched retainer portion fitted with said cylindrical rib of said clamp, such that said cylindrical rib of said clamp rotates within the arched retainer portion about a limited angle.

\* \* \* \* \*